United States Patent [19]

Yoshida

[11] Patent Number: 5,513,447
[45] Date of Patent: May 7, 1996

[54] METHOD FOR DRYING CERAMIC COMPACT

[75] Inventor: Toshihiro Yoshida, Nagoya, Japan

[73] Assignee: NGK Insulators, Ltd., Nagoya, Japan

[21] Appl. No.: 387,564

[22] Filed: Feb. 13, 1995

[30] Foreign Application Priority Data

Mar. 11, 1994 [JP] Japan .................................. 6-040218

[51] Int. Cl.⁶ .......................................... F26B 3/00
[52] U.S. Cl. ................................. 34/491; 34/557
[58] Field of Search ............... 34/491, 494, 542, 34/557

[56] References Cited

U.S. PATENT DOCUMENTS

| | | | |
|---|---|---|---|
| 3,972,128 | 8/1976 | Vanicek | 34/542 |
| 4,253,243 | 3/1981 | Whelan | 34/491 |
| 4,272,894 | 6/1981 | Salviati | 34/557 |
| 4,808,365 | 2/1989 | Kellner et al. | 34/542 |
| 5,347,727 | 9/1994 | Kim | 34/491 |

*Primary Examiner*—John T. Kwon
*Attorney, Agent, or Firm*—Ronald J. Kubovcik

[57] ABSTRACT

A method for drying a ceramic compact includes: maintaining a ceramic compact containing a gelable binder in a condition having a humidity of 70% or higher and having a temperature the same as or higher than a gelating temperature of the gelable binder for a predetermined period of time; and vaporizing water in the ceramic compact. According to the drying method, gelable binder gelates before water is vaporized in a compact, and thereby the compact hardly deforms in accordance with drying shrinkage. Further, the drying method gives uniform drying to the compact in comparison with the conventional hot-air drying. Therefore, use of the compact produced by the drying method significantly reduces deformation, which results from nonuniformity of drying, during the firing process, and a fired body having excellent preciseness in configuration is obtained.

5 Claims, 1 Drawing Sheet

METHOD FOR DRYING CERAMIC COMPACT

BACKGROUND OF THE INVENTION AND RELATED ART STATEMENT

The present invention relates to a method for drying a ceramic compact containing a gelable binder.

There have been known gelable binders which are a kind of organic binders and which are blended in a body so as to improve flowability and moldability by imparting flexibility to the body when the body is prepared. The gelable binders have a property of gelating by being heated at predetermined temperatures or higher. A gelable binder is used for giving a property of maintaining the configuration to a compact having a portion being prone to deform by drying shrinkage of a thin wall, or the like. A compact is obtained by molding a body containing such a gelable binder into a desired configuration. The compact is generally subjected to hot-air drying in a drying process, followed by the next process.

However, the conventional hot-air drying has a problem of causing deformation by drying shrinkage because vaporization of water in a compact and gelation of a gelable binder proceed simultaneously by exposing the compact to the dry, hot air having low humidity in a stage before the gelation of the gelable binder is completed, i.e., in a stage in which the compact is still prone to deform.

Further, in the hot-air drying, since the hot air blowing to the compact has a directivity, it is difficult to dry the whole compact evenly, and thereby the compact is prone to have nonuniformity of drying, which is one of the serious factors of deformation caused to a product in a firing process.

The present invention is achieved in consideration of such a conventional situation. The object of the present invention is to provide a drying method which seldom causes deformation of a ceramic compact containing a gelable binder by dry shrinkage or generation of nonuniformity of drying.

SUMMARY OF THE INVENTION

According to the present invention, there is provided a method for drying a ceramic compact. In the method, a ceramic compact containing a gelable binder is kept for a predetermined period of time in a condition in which humidity is 70% or higher and the temperature is the same as or higher than a gelating temperature of the aforementioned gelable binder. Then, the water in the ceramic compact is vaporized (Namely, the ceramic compact is dried.).

Incidentally, "a gelable binder" in the present invention means an organic binder having a property of gelating by being heated at a predetermined temperature (gelating temperature) or higher.

DETAILED DESCRIPTION OF THE INVENTION

Figure 1:
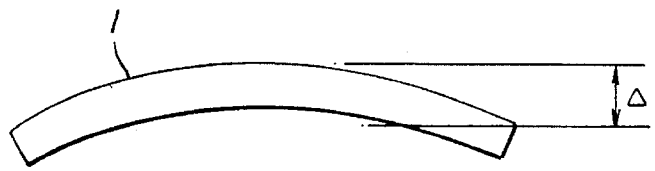
FIG. 1 is an explanatory view showing the straightness of a ceramic body.
Figure 2A:
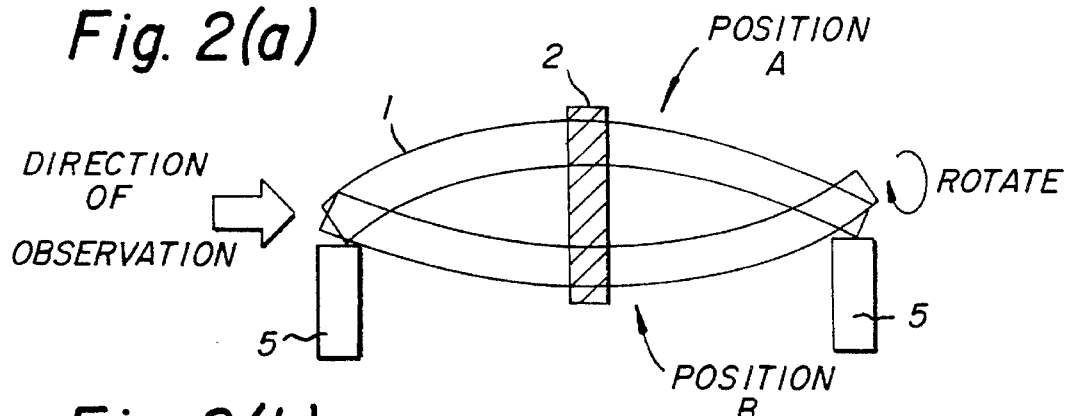
FIGS. 2(a), 2(b), 2(c) and 2(d) are explanatory views showing a method for measuring the straightness of a ceramic body.
Figure 2B:
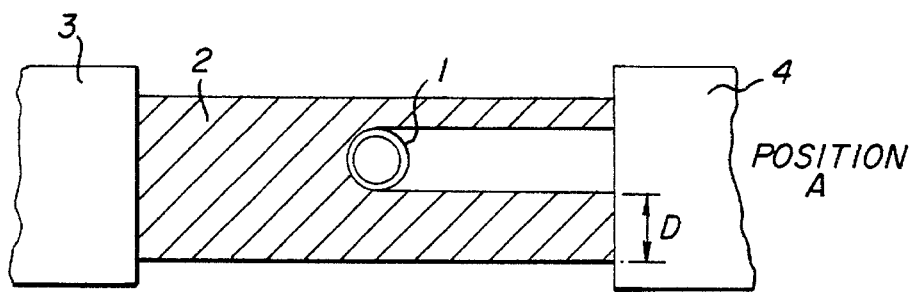
Figure 2C:
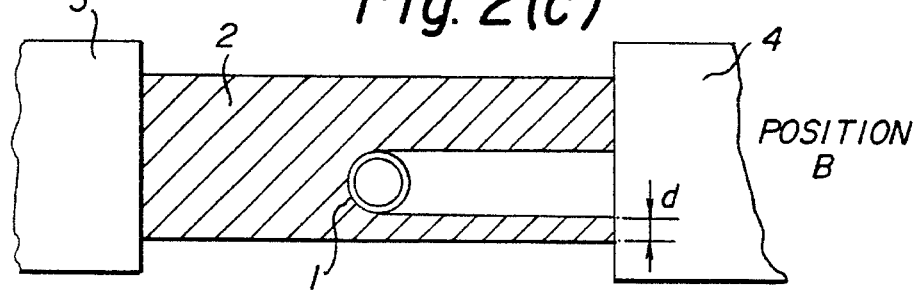
Figure 2D:
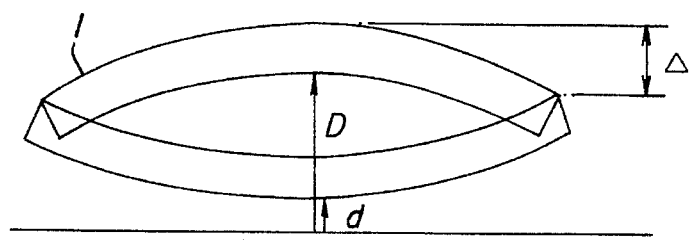

In the method of the present invention, a ceramic compact containing a gelable binder is kept in a condition having a humidity of 70% or higher, preferably 80% or higher, and a temperature the same as or higher than the gelating temperature. Thus, by making the condition humid so that the water is not prone to be vaporized and making the temperature the same as or higher than a gelating temperature, the gelation of the gelable binder is completed before the water is vaporized so as to impart a property to maintain the configuration to some degree.

When the humidity is lower than 70%, the drying proceeds before the gelation of a gelable binder, and the compact is prone to deform.

Incidentally, when the ceramic compact is kept in a highly humid condition such as 70% or higher for too long a period of time, a gelable binder is prone to segregate. Therefore, preferably, the ceramic compact is kept in the humidity of 70% or higher for one hour or less.

Then, the ceramic compact is dried. The humidity is preferably reduced down to 30% or lower, more preferably 20% or lower so that water is easily vaporized. At this time, the gelable binder in the compact has already completed the gelation, which gives resistance to deformation to a certain degree, and thereby, the compact is not prone to deform in accordance with drying shrinkage.

Incidentally, the reason the humidity is determined to be at most 30% is that the condition with the humidity over 30% takes time for drying the compact.

Temperatures after reducing the humidity have only to be suited for drying the compact, and it is not necessary to accord with temperatures before reducing the humidity.

Further, since drying in a condition in which humidity is adjusted as the present invention gives uniform drying to the whole compact in comparison with drying by hot-air drying or the like, the compact hardly has nonuniformity of drying inside thereof. Therefore, a compact dried by a method of the present invention hardly deforms in the firing process, which results from nonuniformity of drying.

Though a configuration of a ceramic compact as a subject of a drying method of the present invention is not specified, the method is suitably applied to, for example, a tubular compact, of which the control of deformation has conventionally been difficult, or a compact having a relatively thin portion, such as a honeycomb structure. A material for a ceramic compact is not specified, either. However, $Si_3N_4$ is suitable as the material.

Therefore, the present invention is very useful as a method for drying a ceramic member which is required to have a tubular configuration with high precision and which is made of $Si_3N_4$, for example, a heat-transfer tube for a shell & tube type of heat-exchanger which is being developed at present as an element of a ceramic gas turbine.

Gelable binders contained in ceramic compacts as subjects of the present invention are: methyl cellulose, hydroxy propyl methyl cellulose, hydroxy ethyl methyl cellulose, etc. Among these, methyl cellulose is most popular. The gelating temperatures of these gelable binders vary from 50°–80° C. in accordance with the kinds. The gelating temperature of methyl cellulose, for example, is about 55° C. A mixture of a plurality of gelable binders is also applicable.

The present invention is hereinafter described in more detail with reference to Examples. However, the present invention is by no means restricted to these Examples.

Example 1

To 1000 g of silicon nitride powder were added 10 g of $Y_2O_3$, 10 g of MgO, 5 g of $ZrO_2$ as sintering aids, 1 g of polyvinyl alcohol as an organic binder, and 1000 g of water. They were ground and mixed for four hours by an attriter using silicon nitride bails each having a diameter of 5 mm. The obtained mixture was dried and granulated by a spray dryer so as to obtain a mixed powder. To the mixed powder were added 50 g of methyl cellulose (Commercial product named SM-400 by Shin-Etsu Chemical Co., Ltd. having a gelating temperature of 55° C.) as a gelable binder and a lubricant so as to obtain a material for producing a tubular compact by an extrusion molding.

The obtained compact was maintained under a condition having a humidity of 70% and a temperature of 80° C. for one hour so that the binder gelates. Then, the humidity was lowered down to 30% together with raising the temperature up to 85° C. so as to subject the compact to drying for seven hours. After being dryed, the compact was calcined to remove the binder at 500° C. for five hours, and further fired at 1650° C. for one hour to obtain a cylindrical body having an outer diameter of 8 mm, an inner diameter of 6 mm, and a length of 600 mm.

The cylindrical body was measured for circularity and straightness, and the results are shown in Table 1.

Example 2

A compact produced in the same manner as in Example 1 was maintained for one hour under a condition having a humidity of 80% and a temperature of 80° C. so that the binder gelates. Then the humidity was lowered down to 30% together with raising the temperature up to 85° C. so as to subject the compact to drying for seven hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Example 3

A compact produced in the same manner as in Example 1 was maintained for one hour under a condition having a humidity of 70% and a temperature of 80° C. so that the binder gelates. Then the humidity was lowered down to 20% together with raising the temperature up to 85° C. so as to subject the compact to drying for seven hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Example 4

A compact produced in the same manner as in Example 1 was maintained for one hour under a condition having a humidity of 70% and a temperature of 80° C. so that the binder gelates. Then the humidity was lowered down to 40% together with lowering the temperature down to room temperature so as to subject the compact to drying for 48 hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Comparative Example 1

A compact produced in the same manner as in Example 1 was subjected to hot-air drying at 110° C. for 10 hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Comparative Example 2

A compact produced in the same manner as in Example 1 was maintained for one hour under a condition having a humidity of 60% and a temperature of 80° C. so that the binder gelates. Then the humidity was lowered down to 30% together with raising the temperature up to 85° C. so as to subject the compact to drying for seven hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Comparative Example 3

A compact produced in the same manner as in Example 1 was maintained for one hour under a condition having a humidity of 60% and a temperature of 80° C. so that the binder gelates. Then the humidity was lowered down to 40% together with raising the temperature up to 85° C. so as to subject the compact to drying for seven hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

Comparative Example 4

A compact produced in the same manner as in Example 1 was maintained for two hour under a condition having a humidity of 70% and a temperature of 80° C. so that the binder gelates. Then the humidity was lowered down to 30% together with raising the temperature up to 85° C. so as to subject the compact to drying for seven hours. After being dried, the compact was calcined and fired in the same manner as in Example 1 so as to obtain a cylindrical body having an outer diameter of 8 mm, an inner diameter of 6 mm, and a length of 600 mm.

The cylindrical body was measured for circularity and straightness, and the results are shown in Table 1.

TABLE 1

|  | Circularity (mm) | Straightness (mm) |
|---|---|---|
| Example 1 | 0.2 | 2.5 |
| Example 2 | 0.1 | 1.5 |
| Example 3 | 0.1 | 2.0 |
| Example 4 | 0.2 | 2.5 |
| Comparative Example 1 | 0.8 | 5.0 |
| Comparative Example 2 | 0.6 | 4.5 |
| Comparative Example 3 | 0.7 | 6.0 |
| Comparative Example 4 | 0.3 | 3.5 |

The measurements for circularity and straightness were performed in the following manner.

Circularity

A contour of the cylindrical body to be measured was compared with concentric circles having various sizes. Circularity was obtained from the sizes of two circles with the contour of the cylindrical body between. A contour projector was used for projecting the contour of the cylindrical body.

Straightness

The straightness denotes a degree Δ of warp of a ceramic body after sintering as shown in FIG. 1. Specifically, as shown in FIGS. 2(a), 2(b), 2(c) and 2(d), the ceramic body 1 is laid on pedestals 5 between an emitting portion 3 and a receiving portion 4 of laser beams 2 expressed by oblique lines. The ceramic body 1 was rotated on the pedestals 5. There were obtained the distances D and d from the bottom of the laser beams 2 to the ceramic body 1 in the position that the deformed portion of the ceramic body 1 became highest (position A) and lowest (position B) respectively. The straightness was obtained by a formula shown below.

Straightness: $\Delta = (D-d)/2$

Comparative Example 1 employed a conventional hot-air drying. In Comparative Example 2, the binder gelated in a condition having a humidity of less than 70%. Comparative Example 3 had a condition of short drying period in spite of relatively high humidity of over 30%. In Comparative Example 4, the period of time for maintaining the compact under a highly humid condition upon gelation exceeds one hour. As shown in Table 1, each of the cylindrical bodies obtained in Examples 1–4 had less deformation and excellent precision of configuration in comparison with the compacts obtained in Comparative Examples 1–4. Further, segregation of the binder was found by eye-observation in the cylindrical body obtained in Comparative Example 4.

As described above, according to a drying method of the present invention, gelable binder gelates before water is vaporized in a compact, and thereby the compact hardly deforms in accordance with drying shrinkage. Further, the method of the present invention gives uniform drying to the compact in comparison with the conventional hot-air drying. Therefore, use of the compact produced by the method of the present invention significantly reduces deformation, which results from nonuniformity of drying, during firing process, and a fired body having excellent preciseness in configuration is obtained.

What is claimed is:

1. A method for drying a ceramic compact, comprising:
   maintaining a ceramic compact containing a gelable binder in a condition having a humidity of 70% or higher and having a temperature at least as high as a gelating temperature of said gelable binder for a predetermined period of time; and
   drying said ceramic compact.

2. A method for drying a ceramic compact according to claim 1, wherein said ceramic compact is dried in a condition having a humidity of 30% or less.

3. A method for drying a ceramic compact according to claim 1, wherein said ceramic compact has a tubular shape.

4. A method for drying a ceramic compact according to claim 1, wherein a ceramic material of said ceramic compact comprises $Si_3N_4$.

5. A method for drying a ceramic compact according to claim 1, wherein said ceramic compact is maintained for one hour or less in said condition having a humidity of 70%.

* * * * *